J. B. WILLINGS.
AUTOMATIC FEED REGULATING AND MIXING DEVICE FOR CRUDE OIL BURNERS.
APPLICATION FILED AUG. 9, 1909.
966,373. Patented Aug. 2, 1910.
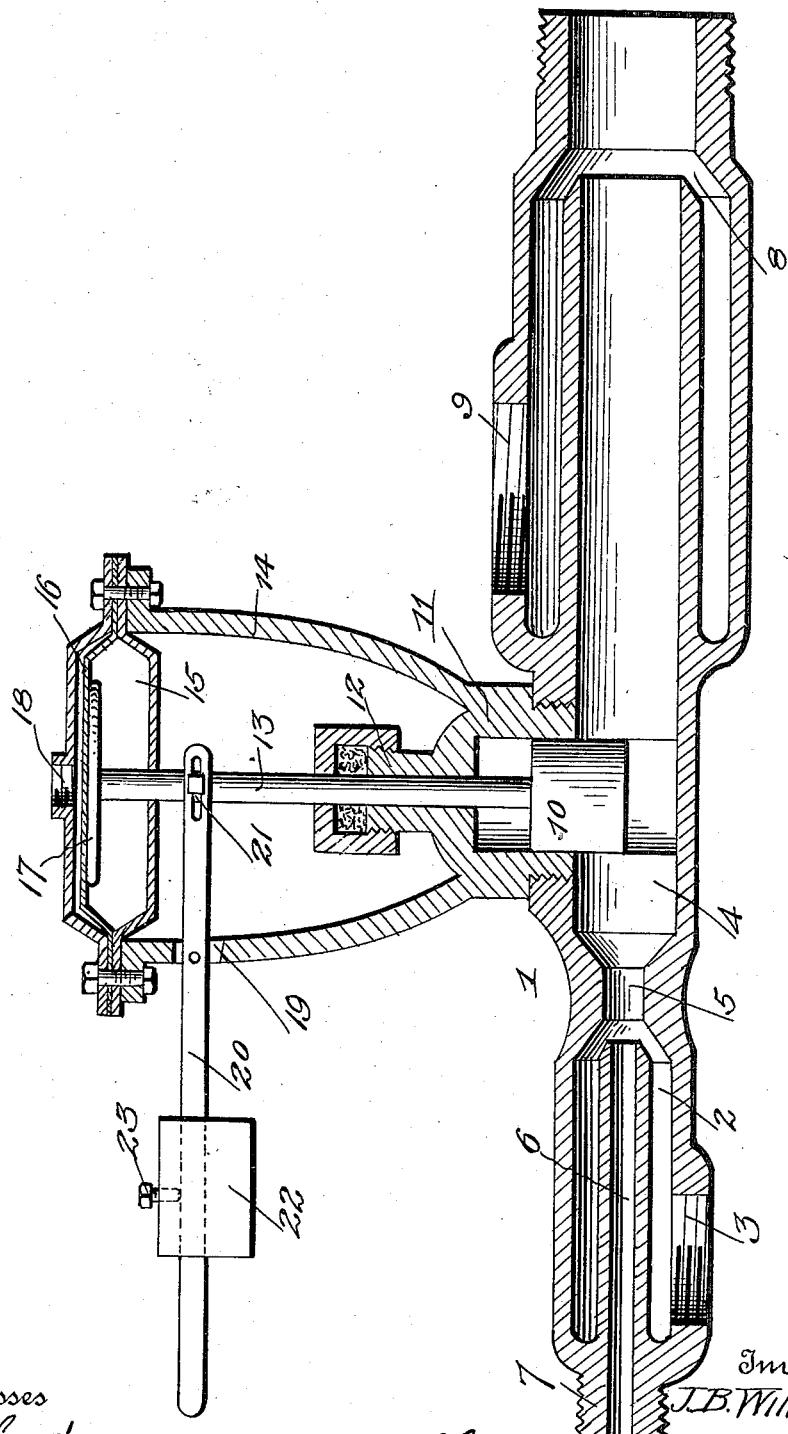
Witnesses
Inventor
J. B. Willings
By Attorneys

UNITED STATES PATENT OFFICE.

JOSEPH B. WILLINGS, OF MARICOPA, CALIFORNIA.

AUTOMATIC FEED REGULATING AND MIXING DEVICE FOR CRUDE-OIL BURNERS.

966,373.   Specification of Letters Patent.   Patented Aug. 2, 1910.

Application filed August 9, 1909. Serial No. 511,978.

*To all whom it may concern:*

Be it known that I, JOSEPH B. WILLINGS, a citizen of the United States, residing at Maricopa, in the county of Kern and State of California, have invented certain new and useful Improvements in Automatic Feed Regulating and Mixing Devices for Crude-Oil Burners; and I do declare the following to be a full, clear, and exact description of the invention, such as will enable others skilled in the art to which it appertains to make and use the same.

This invention relates to improvements in fuel feeding and mixing devices for crude oil burners.

One object of the invention is to provide a device of this character by means of which the supply of oil to the burners of a steam boiler will be automatically regulated by the pressure of steam in the boiler, thereby increasing or diminishing the size of the flame which heats the boiler.

Another object is to provide an automatic fuel oil feed regulating and mixing device, having means to control the automatic feeding mechanism, whereby no more than a predetermined quantity of oil will be fed to the burner.

A further object is to provide an automatic fuel oil feed regulating and mixing device having a mixing chamber with an air inlet port, whereby air will combine with the oil and steam in said chamber and thus be carried as fuel to the burners, causing a perfect and complete combustion.

With the foregoing and other objects in view, the invention consists of certain novel features of construction, combination and arrangement of parts, as will be more fully described and particularly pointed out in the appended claims.

In the accompanying drawings: The figure is a vertical longitudinal sectional view of a feed regulating and mixing device, constructed in accordance with my inventions.

Referring more particularly to the drawings, 1, denotes a feed regulating and mixing device which is here shown and is preferably in the form of a tubular casing having in one end an oil chamber 2, provided with a threaded inlet port 3, to which is adapted to be connected an oil supply pipe, (not shown). The oil chamber 2, communicates with a steam and oil conducting tube 4, through a reduced passage 5, formed between said chamber 2, and the tube 4.

Arranged in the oil chamber 2, and preferably formed integrally with the adjacent end of the device is a steam injecting tube 6, the inner end of which terminates adjacent to the reduced passage 5, while the outer end connects with a threaded nipple 7, to which is adapted to be connected a steam conducting pipe from the boiler. The opposite end of the conducting tube 4, from the passage 5, projects into a mixing chamber 8, which is here shown, and is preferably provided with a threaded air inlet port 9, with which is adapted to be connected an air supply pipe (not shown). The outer end of the mixing chamber 8, beyond the end of the conducting tube 4, is reduced and threaded exteriorly to receive an oil conducting pipe, by means of which the fuel from the mixing chamber 8, is conducted to the burners of the boiler.

In the drawings, the device is shown as being provided with an oil controlling valve 10, by means of which the amount of oil supplied to the burners may be automatically regulated. The controlling valve 10, is preferably arranged in the oil and steam conducting tube 4, at a suitable point adjacent to and between the reduced passage 5, and the discharged end of the conducting tube 4. The valve 10, is provided with a casing 11, which preferably has a screw threaded connection with the conducting tube 4, as shown, and said valve is provided on its upper end with the stuffing box 12, through which operates the stem 13, of the said valve. Arranged on the valve casing 11, and projecting above the same is a dome or chamber 14, in the upper end of which is secured an automatic valve regulating mechanism comprising a casing 15, formed in upper and lower separable sections and having arranged therein a transversely disposed elastic diaphragm 16, against the under side of which engages a disk or plate 17, secured on the upper end of the valve stem 13, which projects through and is slidably mounted in the lower side of the said casing. In the upper side of the casing 15, is formed a threaded port 18, with which is adapted to be connected a steam conducting pipe from the boiler.

Pivotally mounted in the dome 14, and projecting through a slot 19, formed in one side thereof is a valve regulating lever 20, the inner end of which has a loose or slotted connection with the valve stem 13, as shown at 21, and on the outer end of which is adjustably secured a weight 22, having a set screw 23, whereby the same is secured in its adjusted positions on the lever 20. By means of the weight 22, and the lever 20, the amount of steam pressure in the casing 15, required to operate the valve 10, may be controlled.

In the operation of the device, the steam from the boiler enters the injecting tube through the steam conducting pipe and by said tube is injected through the reduced passage 3, in the tube 4, thereby causing a strong suction from the oil chamber 2, which will draw the oil from said chamber and force the same through the reduced passage into and through the conducting tube 4, into the mixing chamber 8, where it combines with the air in said chamber and is conducted in the form of fuel through the conducting pipe to the burner of the boiler.

In order to regulate the flow of the oil through the conducting tube 4, I provide a suitable controlling valve, which is adapted to open or close the conducting tube 4, to a greater or less extent, thereby causing the steam injected through the passage 5, into the conducting tube 4, to act upon the said controlling valve with the required pressure so as to regulate the amount of oil passing through the conducting tube 4, to the mixing chamber 8.

In the drawings, the regulating valve 10, is shown as being provided with an automatic steam controlled means for operating the same, whereby when the pressure of steam in the boiler increases beyond a normal or predetermined pressure, said valve will be operated to reduce the amount of oil passing through the conducting tube 4, as hereinbefore described. By adjusting the weight 22, on the lever 20, which is connected to the stem 13, of the regulating valve 10, the amount of steam pressure required to operate said valve may be accurately controlled.

By providing the regulating valve herein shown and described, the amount of oil and steam passing through the conducting tube 4, is controlled so that no more than a predetermined quantity of oil can be fed to the burner. While the device is shown in the drawings and described as being provided with a mixing chamber 8, having an air inlet port 9, it is obvious that I may with equal advantage employ other means for combining air with the oil to form the fuel.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention what I claim is:

1. A fuel feeding device for crude oil burners comprising a conducting tube having in one end an oil chamber, a steam injecting tube in said oil chamber, a mixing chamber surrounding the outer end of the conducting tube, a valve casing provided with a hollow dome screwing in the conducting tube between the mixing chamber and oil and steam injecting chambers, a regulating valve arranged in said conducting tube and movable into the valve casing to regulate the quantity of oil and steam passing through the tube, a weighted lever pivoted to the dome and loosely connected with the stem of the regulating valve and an elastic diaphragm in the upper end of the dome engaging the upper end of the valve stem and adapted to move the valve into cut-off position when the pressure upon the diaphragm over-balances the weighted lever.

2. A fuel feeding device for crude oil burners comprising a conducting tube having in one end an oil chamber, a steam injecting tube in said oil chamber, a mixing chamber surrounding the outer end of the conducting tube, a valve casing provided with a hollow dome screwing in the conducting tube between the mixing chamber and oil and steam injecting chambers, a regulating valve arranged in said conducting tube and movable into the valve casing to regulate the quantity of oil and steam passing through the tube, a weighted lever pivoted to the casing and having a slotted engagement with the valve stem to normally hold the valve in raised position, a disk upon the upper end of the valve stem, an elastic diaphragm arranged in the casing and engaging said disk, and a cover plate having a steam inlet opening over said diaphragm, the diaphragm being adapted to move the valve in a cut-off position when the pressure of steam thereupon over-balances the weighted lever.

In testimony whereof I have hereunto set my hand in presence of two subscribing witnesses.

JOSEPH B. WILLINGS.

Witnesses:
E. L. HARMAN,
O. L. CLARK.